United States Patent [19]

Rashkin

[11] 3,997,429
[45] Dec. 14, 1976

[54] REFORMING CATALYST
[75] Inventor: Jay A. Rashkin, Piscataway, N.J.
[73] Assignee: Cities Service Oil Company, Tulsa, Okla.
[22] Filed: Mar. 26, 1971
[21] Appl. No.: 128,436
[52] U.S. Cl. .............................. 208/139; 252/441
[51] Int. Cl.$^2$ ....................................... C10G 35/08
[58] Field of Search ........... 208/138, 139; 252/441

[56] References Cited

UNITED STATES PATENTS

| | | | |
|---|---|---|---|
| 2,841,626 | 7/1958 | Holzman et al. | 252/441 |
| 2,914,464 | 11/1959 | Burton et al. | 208/138 |
| 3,000,811 | 9/1961 | Murray et al. | 208/138 |
| 3,280,041 | 10/1966 | Michael | 208/138 |
| 3,400,073 | 9/1968 | Schwarzenbek et al. | 208/138 |
| 3,459,681 | 8/1969 | Innes et al. | 208/138 |
| 3,655,747 | 4/1972 | Sennewald et al. | 252/473 |
| 3,662,019 | 5/1972 | Stratenus | 260/683.3 |
| 3,755,198 | 8/1973 | Stratenus | 252/466 PE |
| 3,868,317 | 2/1975 | Itoh et al. | 208/139 |

*Primary Examiner*—D. Horwitz
*Assistant Examiner*—James W. Hellwege
*Attorney, Agent, or Firm*—John W. Carpenter; Edwin T. Yates

[57] ABSTRACT

A reforming catalyst comprising minor amounts of platinum and cadmium and chloride on an alumina support. Preferably the cadmium is in the amount of about 0.2% wt. and the platinum is in the amount of about 0.4% wt. and the chloride is in the amount of about 0.1% wt. to 2.0% wt. of the catalyst.

7 Claims, 5 Drawing Figures

INVENTOR.
JAY A. RASHKIN
BY
ATTORNEY

REFORMING CATALYST

BACKGROUND OF THE INVENTION

This invention relates to a novel reforming catalyst useful in converting hydrocarbons to aromatic hydrocarbons. More particularly this invention is directed to a novel platinum on alumina catalyst useful in reforming low octane gasoline stocks to ones having a higher octane rating. It is well known that certain aromatic hydrocarbons have desirably high octane ratings while other hydrocarbons are themselves low octane fuel components. For instance, n-heptane has a research octane rating of 0, heptene-2 a rating of 73, and methylcyclohexane a rating of 75, while toluene has a rating of 120. Thus in catalytic reforming the principal object is to convert other hydrocarbons to aromatics at high conversion rates, with as little volumetric loss as possible. [Selectively the reforming catalyst operates to dehydrogenate, dehydroisomerize, and dehydrocyclize the hydrocarbons.]

In converting hydrocarbons to aromatics, which have less hydrogen than either cycloalkanes or paraffins, various catalysts have been employed. Among those which have been of commercial interest are platinum on either alumina or silica-alumina, chromia on alumina, and cobalt molybdate on alumina. The ideal catalyst would, of course, convert all other hydrocarbons selectively to aromatics rapidly, with only a small catalyst inventory while inhibiting hydrocracking and other competing reactions. Platinum catalysts on a suitable carrier or support have proved to be the most expensive initially. Still despite their original cost, their effectiveness has justified their use and they are the preferred reforming catalyst in industry today. One such preferred commercially viable platinum on alumina catalyst employs rhenium therein as a cocatalyst with the platinum. This catalyst exhibits several desirable features including a high $C_5+$ yield stability. Rhenium itself is as costly if not more costly than platinum. In addition, the availability of rhenium is such that its use in refinery operations may be limited by its scarcity rather than its cost. It would, therefore, be decidedly advantageous to have a reforming catalyst as effective as the platinum-rhenium on alumina composition but without rhenium.

SUMMARY OF THE INVENTION

I have, therefore, discovered a novel reforming catalyst comprising an alumina porous support impregnated with minor amounts of platinum, cadmium and chloride. More specifically, the platinum is in the amount of from 0.1% to 1.0% by weight; the cadmium is in the amount of from 0.1% to 2.0% by weight and chloride is in the amount of from .01% to 2.0% wt. Preferably the support is a gamma alumina particle impregnated with a platinum content of about 0.4% wt. and a cadmium content of about 0.2% wt.

It is, therefore, an object of the present invention to provide a novel reforming catalyst to produce gasoline fuels. Another object of the present invention is to provide a more readily available commercially acceptable reforming catalyst. Still another object of the present invention is to provide a novel improvement in the catalytic reforming of gasoline fractions. Other objects and advantages of the catalyst composition of the present invention and method of using same will be apparent from the description of the preferred embodiment which follows.

DESCRIPTION OF THE PREFERRED EMBODIMENT

Figure 1:
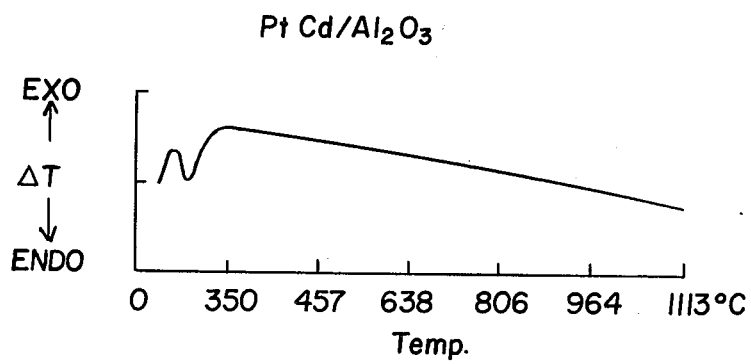
FIG. 1 is a graphical illustration of DTA thermogram obtained in testing the catalyst composition of the present invention.
Figure 2:
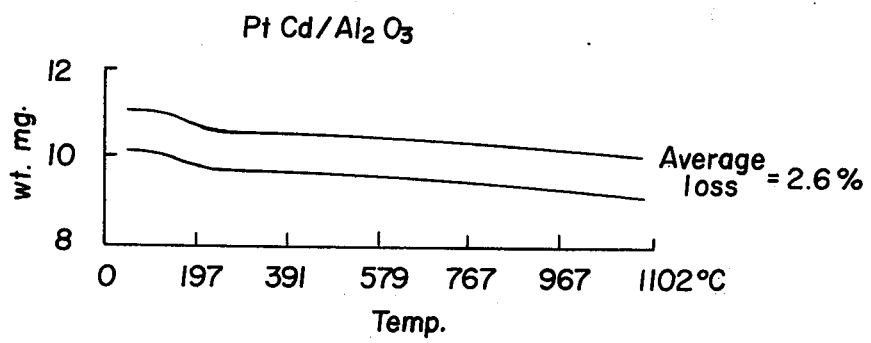
FIG. 2 is a graphical illustration of thermogravimetric (TGA) results for the composition of the present invention.
Figure 3:
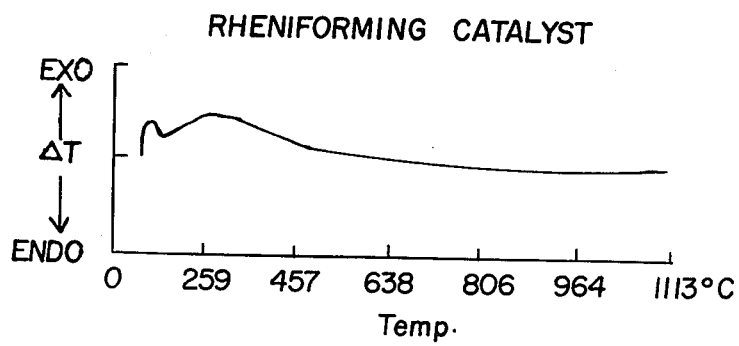
FIG. 3 is a graphical illustration of the DTA thermogram obtained with a commercial quality platinum rhenium catalyst.
Figure 4:
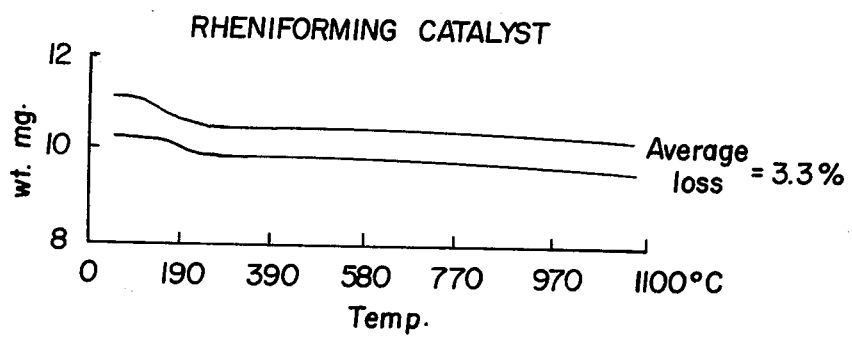
FIG. 4 is a graphical illustration of TGA results obtained with a commercial platinum rhenium catalyst.

Briefly my invention is a novel reforming catalyst utilizing cadmium as a cocatalyst in combination with platinum, both in minor proportions on a suitably porous eta or gamma alumina support. The catalyst composition according to this invention exhibits commercially satisfactory selectivity, activity, product yield and quality as a reforming catalyst. The catalyst composition comprises platinum and cadmium in amounts of from 0.10% to about 3.0% by wt. of the total catalyst composition. Preferably the platinum is in the amount of from about 0.1 to about 1.0% by wt. and the cadmium is in the amount of from 0.1% to 2.0% by wt. In addition, chloride is included in the amount of from 0.1% wt. to about 2.0% wt. While cadmium, platinum and chloride may be employed in amounts of up to 5% wt., such a high level is not desirable and results in rapid depletion of cadmium.

While other support materials such as silica-alumina, zirconia or silica alone may be suitable, the gamma alumina as embodied in a conventional reforming catalyst support is the preferred material. Such a catalyst support may be prepared by any known conventional process. For instance, the alumina support may be prepared by alkalyzing a solution of an acid-acting water soluble aluminum salt such as aluminum chloride after which the resulting precipitate is filtered and the filter cake mulled if desired. Inert binders or lubricants may be added to the mixture. The precipitated alumina which is generally a gel or hydrate is mulled, pelleted and calcined to obtain the form of alumina support desired, preferably the gamma alumina form though eta alumina is also appropriate as a support. Other methods of preparing gamma alumina may be used and are well known.

The cocatalyst metals of the catalyst according to the present invention are combined with the support in a conventional manner as by immersing the alumina support in solutions of the cocatalyst after which the impregnated support is dried and further calcined in air to produce the oxidized form of the catalyst. Alternatively the cocatalyst metals, specifically platinum and cadmium, could be coprecipitated with the alumina out of solution, if desired.

Preferably the catalyst of this invention is produced by impregnating a commercially available reforming gamma alumina support via the minimum solution method i.e. the solution volume is equal to the absorption capacity of the alumina support, with an aqueous solution of chloroplatinic acid and cadmium chloride, after which the wet impregnate is dried at 110° C (230° F) overnight and subsequently calcined in air for two hours at 900° F. For example, a specific impregnation solution was made up of chloroplatinic acid ($H_2PtCl_6 \cdot 6H_2O$) and cadmium chloride ($CdCl_2 \cdot 2\ 1/2H_2O$) and after treatment of the support resulted in a catalyst comprising 0.4% wt. Pt, 0.2% wt. Cd, and a chloride content of about 0.6% wt. on gamma alumina.

The above described catalyst was subjected to various tests to determine its suitability as a reforming catalyst, particularly in reference to a commercial platinum-rhenium on alumina catalyst, and was found to be an excellent substitute with equivalent or possibly superior performance.

For instance, thermal stability was tested by means of differential thermal analysis (DTA), and thermogravimetric analysis (TGA) and the data shown in FIGS. 1 to 4 against data obtained for a commercial platinum rhenium catalyst. Comparing FIGS. 1 and 3 it is seen that the DTA thermograms for the two catalysts are virtually identical while the TGA data in FIGS. 2 and 4

5 indicates that the platinum cadmium catalyst yields at least as much if not more $C_5+$ material at equivalent octane ratings as the comparable platinum rhenium catalyst. The performance of the platinum cadmium catalyst is shown as points while that of the platinum rhenium catalyst is shown as a line.

Employing the aforementioned platinum cadmium catalyst (in the amount of about 0.4% wt. Pt, 0.2% wt. Cd and 0.6% chloride), a series of bench scale tests was run on the reforming naphtha. The tests were performed for a period of 4 hours each at a pressure of 200 psig. The ratio of hydrogen to hydrocarbon feed was 5.3 moles $H_2$ to one mole hydrocarbon. Results are as tabulated below in Table 1, which shows $C_5+$ yield, (this being the desired product) octane number, (as high an octane number as possible being desired), and performance number value which is useful in characterizing fuel and is obtained with the following equation:

$$\text{Performance No.} = \frac{2800}{128\text{-Octane Number}}$$

TABLE 1

| Run Number | 994 | 995 | 996 | 997 | 998 | 999 | 1000 | 1001 | 1002 | 1003 |
|---|---|---|---|---|---|---|---|---|---|---|
| Temp. 20 F | 911 | 911 | 911 | 922 | 923 | 922 | 922 | 921 | 921 | 921 |
| Space Velocity W/hr/W | 2.00 | 1.99 | 1.99 | 1.99 | 1.99 | 1.99 | 1.98 | 2.00 | 2.00 | 2.00 |
| Relative Activity | 2.98 | 2.67 | 2.47 | 2.75 | 2.49 | 2.43 | 2.36 | 2.36 | 2.32 | 2.20 |
| Total $C_5+$Yield Vol. % | 83.2 | 84.9 | 85.4 | 81.0 | 83.8 | 83.3 | 84.1 | 84.1 | 84.3 | 84.4 |
| $C_5$+F-1 Clear Octane | 93.1 | 91.5 | 89.9 | 94.1 | 92.5 | 92.1 | 91.8 | 91.5 | 91.4 | 90.2 |
| Performance No. | 80.4 | 76.7 | 73.5 | 82.7 | 79.0 | 78.1 | 77.3 | 76.8 | 76.5 | 74.0 |
| Run Number | 1004 | 1005 | 1006 | 1007 | 1008 | 1009 | 1010 | 1011 | 1012 | 1013 |
| Temp. ° F | 922 | 931 | 932 | 931 | 932 | 932 | 930 | 930 | 922 | 910 |
| Space Velocity W/hr/W | 1.99 | 2.00 | 2.00 | 1.99 | 2.00 | 1.99 | 1.99 | 2.00 | 2.00 | 2.00 |
| Relative Activity | 2.39 | 2.40 | 2.36 | 2.36 | 2.31 | 2.31 | 2.15 | 2.28 | 2.28 | 2.40 |
| Total $C_5+$Yield | 83.9 | 82.9 | 83.3 | 83.3 | 82.6 | 82.9 | 83.7 | 83.4 | 85.2 | 86.8 |
| $C_5$ F-1 Clear Octane | 91.9 | 94.9 | 94.6 | 94.6 | 94.6 | 94.6 | 93.6 | 94.2 | 91.0 | 89.0 |
| Performance No. | 77.6 | 84.6 | 84.0 | 83.8 | 84.0 | 83.8 | 81.4 | 82.8 | 75.7 | 71.9 | show the weight loss of the Pt/Cd catalyst to be lower, i.e. 2.6% wt. to 3.3% wt. These indicate that the platinum cadmium catalyst of the present invention is at least as thermally stable as commercial platinum rhenium catalyst.

For purposes of comparison, the same bench tests were performed as a series of runs with the platinum rhenium catalyst (Rheniforming Catalyst). Results obtained are shown in Table 2.

TABLE 2

| Run Number | 892 | 893 | 894 | 896 | 897 | 898 | 899 |
|---|---|---|---|---|---|---|---|
| Temp. ° F | 900 | 900 | 910 | 920 | 920 | 925 | 945 |
| Space Velocity W/hr/W | 2.00 | 2.00 | 2.00 | 2.02 | 2.00 | 2.00 | 2.00 |
| Relative Activity | 2.7 | 2.7 | 2.5 | 2.6 | 2.3 | 2.3 | 2.1 |
| Total $C_5+$ Yield Vol. % | 84.0 | 85.2 | 85.5 | 83.4 | 84.7 | 84.1 | 81.6 |
| $C_5$+ F-1 Clear Octane | 87.7 | 87.5 | 88.7 | 91.7 | 89.9 | 92.7 | 94.6 |
| Performance No. | 69.6 | 69.3 | 71.2 | 77.3 | 73.5 | 79.4 | 84.0 |

Figure 5:
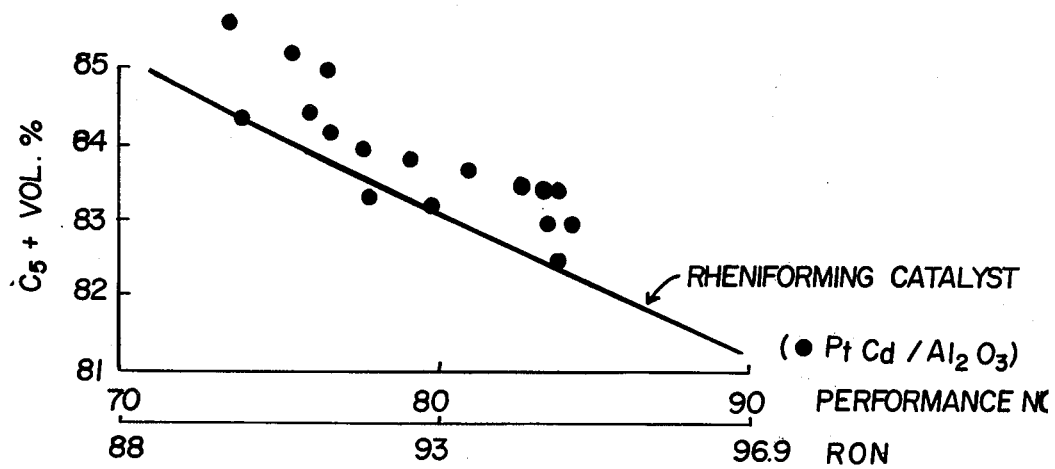
FIG. 5 is a graphical illustration of yield vs Performance Number and Octane Number of reformed hydrocarbon using the catalyst of the present invention and commercially effective platinum, rhenium catalyst.

The above described platinum cadmium catalyst and a commercial platinum rhenium catalyst were tested in a laboratory reforming unit under similar conditions using a typical hydrodesulfurized (less than 1 ppm sulfur) midcontinent naphtha as a reforming feedstock. The results obtained are shown in Table 1 for the platinum cadmium catalyst and in Table 2 for the platinum rhenium catalyst. Comparison of $C_5+$ yield vs $C_5+$ octane data for the platinum cadmium catalyst and for the prior art platinum rhenium catalyst is shown in FIG. 5 of the drawings. Examination of the data shown in FIG.

It can therefore be recognized that the catalyst composition of the present invention is a decidedly desirable substitute for the platinum rhenium catalyst presently used due to its effectiveness, its cost and availability.

Having thus fully described my invention and wishing to cover those modifications and variations which would be apparent to one skilled in the art, but without departing from either the spirit or scope thereof,

I claim:

1. A catalyst composition for catalytically reforming hydrocarbon feedstock, said composition comprising an alumina support impregnated with minor amounts of platinum, cadmium, and chloride wherein said alumina support is selected from the group consisting of eta alumina, gamma alumina and mixtures thereof, said platinum and cadmium are each in the amount of from about 0.1% wt. to about 3% wt. and the chloride is in the amount of from 0.1% wt. to about 2% wt.

2. The catalyst composition of claim 1, wherein said support is gamma alumina.

3. The catalyst composition of claim 2 wherein the platinum is in the amount of from 0.1% wt. to 1.0% wt, and the cadmium is in the amount of from 0.1% wt. to 2.0% wt.

4. The catalyst composition of claim 3 wherein the platinum is in the amount of about 0.4% wt., the cadmium is in the amount of about 0.2% wt. and the chloride is in the amount of about 0.6% wt.

5. A process for catalytically reforming hydrocarbon feedstock to dehydrogenate, dehydroisomerize and dehydrocyclize said feedstock, said process comprising reacting said feedstock in a reforming zone at suitable pressure and temperature with hydrogen in the presence of a catalyst composition comprising an alumina support and minor amounts of platinum, cadmium and chloride wherein said alumina support is gamma alumina and wherein the platinum and cadmium are each in the amount of from about 0.1% wt. to about 3% wt. and the chloride is in the amount of from 0.1% wt. to about 2% wt.

6. The process of claim 5 wherein the platinum is in the amount of about 4% wt., the cadmium is in the amount of about 0.2% wt. and the chloride is in the amount of about 0.6% wt.

7. A process for catalytically reforming a naphtha feedstock, said process comprising reacting said feedstock in a reforming zone under reforming conditions with hydrogen in contact with a catalyst composition comprising an alumina support and minor amounts of platinum, cadmium and chloride wherein the platinum and cadmium are each present in the amount of from about 0.1% wt. to about 3% wt. and the chloride is present in the amount of from 0.1% wt. to about 2% wt.

* * * * *